(12) United States Patent
Alecu

(10) Patent No.: US 12,388,325 B1
(45) Date of Patent: Aug. 12, 2025

(54) ELECTRIC MOTOR WITH STATOR COOLING

(71) Applicant: Pratt & Whitney Canada Corp., Longueuil (CA)

(72) Inventor: Daniel Alecu, Ottawa (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/634,498

(22) Filed: Apr. 12, 2024

(51) Int. Cl.
| | |
|---|---|
| H02K 9/19 | (2006.01) |
| B64D 27/33 | (2024.01) |
| H02K 1/20 | (2006.01) |
| H02K 5/20 | (2006.01) |
| H02K 7/116 | (2006.01) |
| H02K 7/18 | (2006.01) |

(52) U.S. Cl.
CPC .............. *H02K 9/19* (2013.01); *B64D 27/33* (2024.01); *H02K 1/20* (2013.01); *H02K 5/203* (2021.01); *H02K 7/116* (2013.01); *H02K 7/1823* (2013.01)

(58) Field of Classification Search
CPC ............ H02K 9/19; H02K 1/20; H02K 5/203; H02K 7/116; H02K 7/1823; B64D 27/33
See application file for complete search history.

(56) References Cited

U.S. PATENT DOCUMENTS

| | | | |
|---|---|---|---|
| 7,605,504 B2 | 10/2009 | El-Rafaie | |
| 2019/0165634 A1* | 5/2019 | Whaley | H02K 3/50 |
| 2021/0067006 A1* | 3/2021 | Lee | H02K 3/50 |
| 2024/0030766 A1 | 1/2024 | Alahyari | |

FOREIGN PATENT DOCUMENTS

| | | |
|---|---|---|
| JP | 2000236649 A | 8/2000 |
| WO | 2020174176 A1 | 9/2020 |

* cited by examiner

*Primary Examiner* — Joseph Ortega
(74) *Attorney, Agent, or Firm* — Getz Balich LLC

(57) ABSTRACT

An electric motor is provided that includes a housing, a stator, a rotor, and a coolant. The rotor has an output shaft. The rotor is disposed radially inside of the stator and is configured for rotation relative to the stator about a rotational axis. The stator includes an outer radial ring portion and a plurality of stator poles. Each stator pole extends radially inward from the outer radial ring portion to a distal end. The stator includes a plurality of stator cooling circuits. Each stator cooling circuit includes a circumferentially extending outer radial channel located in the outer radial ring portion of the stator and a stator pole channel disposed in each stator pole. The stator pole channel is in fluid communication with the outer radial channel. The stator pole channel extends radially within the respective stator pole. The coolant has magnetic properties disposed in the stator cooling circuits.

20 Claims, 4 Drawing Sheets

ELECTRIC MOTOR WITH STATOR COOLING

BACKGROUND OF THE DISCLOSURE

1. Technical Field

This disclosure relates generally to electric motors in general, and to cooled electric motors is particular.

2. Background Information

Electric motors may be used for various purposes within an aircraft. In aircraft hybrid electric propulsion systems, electric motors may be used to provide propulsion power. All electric motors have performance limits. The power produced by an electric motor is a product of the speed and torque of the electric motor. Electric motor power is a quadratic function of rotor speed. Electric motors are typically configured to have a nominal power rating (i.e., a mechanical power output that the motor can safely produce at a given speed and voltage) and a maximum available power rating. The nominal power rating may be only thirty to thirty-five percent (30-35%) of the maximum available power rating. The maximum available power of an electric motor typically lies somewhere in the middle of the operating speed range of the electric motor. The electric motor cannot be operated at or above the maximum available power rating for an extended period of time or the electric motor will be damaged due to overheating. It is desirable to increase the maximum available power rating of an electric motor and/or the duration at which an electric motor can be operated at maximum available power rating, particularly for electric motors that are used in aircraft applications.

SUMMARY OF THE DISCLOSURE

According to an aspect of the present disclosure, an electric motor is provided that includes a housing, a stator, a rotor, and a coolant. The stator is disposed in the housing in a positionally fixed manner. The rotor has an output shaft and a plurality of rotor poles. The rotor is disposed radially inside of the stator and is configured for rotation relative to the stator about a rotational axis. The stator includes an outer radial ring portion and a plurality of stator poles. Each stator pole extends radially inward from the outer radial ring portion to a distal end, and the distal ends of the stator poles are separated from the rotor poles by an annular air gap. The stator includes a plurality of stator cooling circuits. Each stator cooling circuit includes a circumferentially extending outer radial channel located in the outer radial ring portion of the stator and a stator pole channel disposed in each stator pole. The stator pole channel is in fluid communication with the outer radial channel. The stator pole channel extends radially within the respective stator pole. The coolant has magnetic properties disposed in the stator cooling circuits.

In any of the aspects or embodiments described above and herein, the outer radial channel of each stator cooling circuit may extend around an entirety of a circumference of the stator.

In any of the aspects or embodiments described above and herein, each respective stator pole channel (SPC) within a respective cooling circuit may extend from a first end at the outer radial channel to a SPC distal end proximate the SP distal end, and an air vent may be in fluid communication with the stator pole channel adjacent the SPC distal end.

In any of the aspects or embodiments described above and herein, each respective stator pole may have a width that extends between a first lateral side and a second lateral side, the second lateral side opposite the first lateral side and a radial length that extends from the outer radial ring portion to a distal end.

In any of the aspects or embodiments described above and herein, each respective cooling circuit may include a first stator pole channel disposed in each stator pole and a second stator pole channel disposed in each stator pole.

In any of the aspects or embodiments described above and herein, the first stator pole channel (FSPC) may extend from a FSPC first end at the outer radial channel to a FSPC distal end proximate the SP distal end, and a first air vent may be in fluid communication with the first stator pole channel adjacent the FSPC distal end, and the second stator pole channel (SSPC) may extend from a SSPC first end at the outer radial channel to a SSPC distal end proximate the SP distal end, and a second air vent may be in fluid communication with the second stator pole channel adjacent the SSPC distal end.

In any of the aspects or embodiments described above and herein, each stator pole may have a first lateral extension extending laterally out from the first lateral side adjacent the SP distal end, and may have second lateral extension extending laterally out from the second lateral side adjacent the SP distal end.

In any of the aspects or embodiments described above and herein, the first stator pole channel may extend into the first lateral extension, and the second stator pole channel may extend into the second lateral extension.

In any of the aspects or embodiments described above and herein, the first air vent may be in fluid communication with an exterior of the stator pole at a first point radially outward of the SP distal end, and the second air vent may be in fluid communication with the exterior of the stator pole at a second point radially outward of the SP distal end.

In any of the aspects or embodiments described above and herein, the housing may include at least one liquid coolant passage.

In any of the aspects or embodiments described above and herein, the housing may include a plurality of liquid coolant passages disposed to receive thermal energy from the stator.

In any of the aspects or embodiments described above and herein, the stator may comprises a plurality of lamination layers that collectively form the stator. Each respective cooling circuit may be formed within a respective lamination layer, and the plurality of cooling circuits may be spaced apart from one another along the rotational axis.

In any of the aspects or embodiments described above and herein, the stator may comprise a plurality of lamination layers that collectively form the stator. Each respective cooling circuit may be formed by a first lamination layer having a channel void that extends through the first lamination layer between a first and second side surfaces of the first lamination layer, a first adjacent lamination layer disposed contiguous with the first side surface of the first lamination layer and a second adjacent lamination layer disposed contiguous with the second side surface of the first lamination layer.

In any of the aspects or embodiments described above and herein, the stator may be configured such that subjecting the stator to rotating magnetic fields causes the coolant to travel circumferentially within the outer radial channel.

In any of the aspects or embodiments described above and herein, the stator may be configured such that subjecting the stator to the rotating magnetic fields produces magnetic field gradients that urge the coolant into the stator pole channel disposed in each stator pole and subsequently urges the coolant from the stator pole channel disposed in each stator pole.

In any of the aspects or embodiments described above and herein, the stator pole channel (SPC) may include a SPC distal end and an air vent in fluid communication with the stator pole channel adjacent the SPC distal end, and wherein coolant urged into the stator pole channel may cause air within the stator pole channel to egress from the stator pole channel through the air vent, and wherein coolant urged from the stator pole channel may cause air to ingress into the stator pole channel to egress through the air vent.

According to an aspect of the present disclosure, a hybrid electric propulsion (HEP) system for an aircraft is provided that includes a thermal engine, an electric motor, a gearbox, and an electric power storage unit. The gearbox is in communication with the thermal engine and the electric motor. The electric power storage unit is configured to provide electrical power to the electric motor. The electric motor includes a housing, a stator, a rotor, and coolant. The stator is disposed in the housing in a positionally fixed manner. The rotor has an output shaft and a plurality of rotor poles. The rotor is disposed radially inside of the stator and is configured for rotation relative to the stator about a rotational axis. The stator includes an outer radial ring portion and a plurality of stator poles. Each stator pole extends radially inward from the outer radial ring portion to a distal end. The distal ends of the plurality of stator poles are separated from the rotor poles by an annular air gap. The stator includes a plurality of stator cooling circuits. Each stator cooling circuit includes a circumferentially extending outer radial channel located in the outer radial ring portion of the stator and a stator pole channel disposed in each stator pole. The stator pole channel is in fluid communication with the outer radial channel, and the stator pole channel extends radially within the respective stator pole. The coolant has magnetic properties disposed in the stator cooling circuits.

In any of the aspects or embodiments described above and herein, the housing may include at least one liquid coolant passage, and the liquid coolant passage may be in fluid communication with a housing coolant system configured to cycle a liquid coolant through the coolant passage.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to an electric motor with stator cooling. As will be detailed herein, a present disclosure electric motor may be utilized within an aircraft propulsion system.

Figure 1:
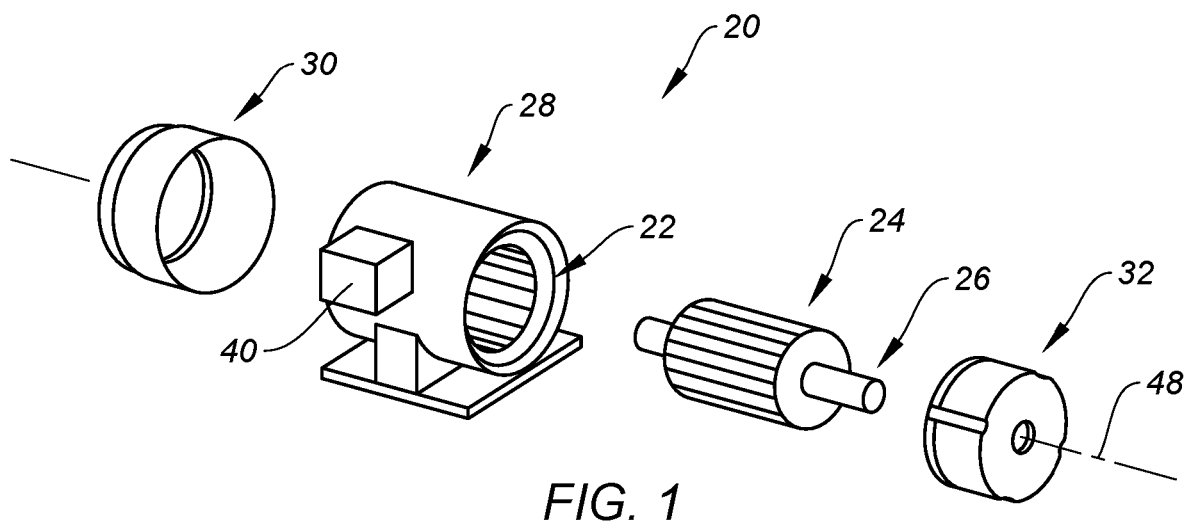
FIG. 1 is a diagrammatic exploded view of an electric motor.

FIG. 1 is a diagrammatic exploded view of an alternating current (AC) electric motor 20 that includes a stator 22, a rotor 24 having an output shaft 26, a housing 28 (sometimes referred to as a "casing"), a first end bell 30, and a second end bell 32. In some embodiments, one or both end bells 30, 32 may be incorporated with the housing 28. The rotor 24 is rotationally mounted within the stator 22 with bearings, extending between the first and second end bells 30, 32. As will be detailed herein, the stator 22 includes a plurality of stator poles 34 (e.g., see FIG. 2) and the rotor 24 includes a plurality of rotor poles 36. The stator 22 is non-rotationally mounted within the housing 28, with an air gap 38 disposed between the stator poles 34 and rotor poles 36. The housing 28 may include an electrical connection box 40 attached to the outside of the housing 28. Alternating electrical current passing through windings in the stator 22 produces rotating magnetic fields between the stator poles 34 and the rotor poles 36 and the rotating magnetic fields cause the rotor 24 to rotate relative to the stator 22. There are various different known AC electric motor configurations having stator poles 34 and rotor poles 36. The present disclosure is not limited to any particular motor 20 configuration other than as detailed herein.

Figure 2:
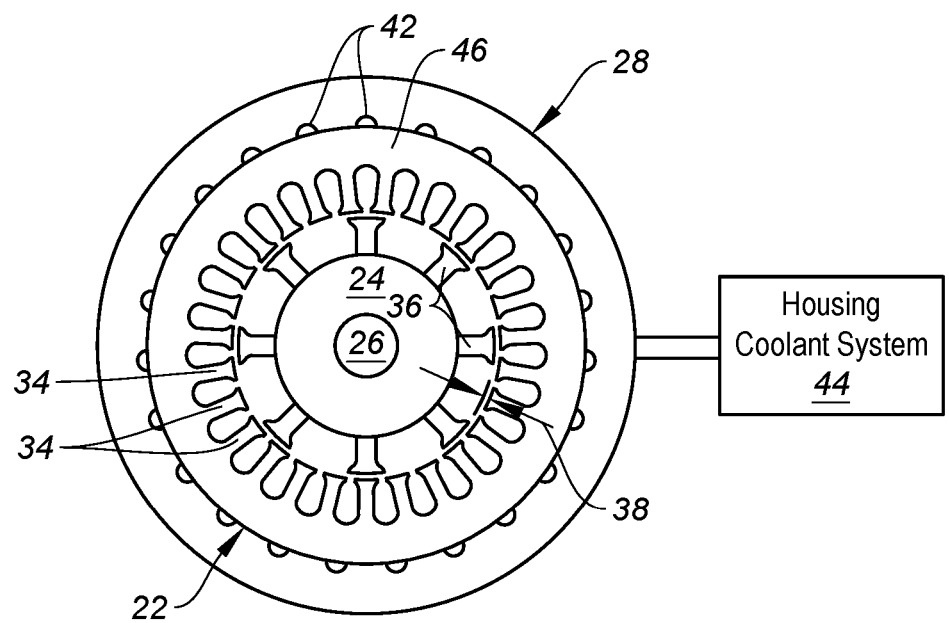
FIG. 2 is a diagrammatic sectional view of an electric motor.

FIG. 2 shows a diagrammatic sectional view of an electric motor 20 showing a stator 22 disposed within a housing 28, and a rotor 24 and output shaft 26 disposed radially inside of the stator 22. The housing 28 is configured to dissipate thermal energy. In some embodiments, the housing 28 may be air-cooled; e.g., having fins and/or other heat transfer structures (not shown) extending radially outward, or the like. In some embodiments, the housing 28 may be liquid cooled. For example, the electric motor housing 28 may be configured with one or more liquid passages 42 that may be disposed within the housing 28 or may be defined by a jacket coupled with the housing 28, or the like. FIG. 2 diagrammatically illustrates a housing 28 having a plurality of liquid coolant passages 42. The present disclosure is not limited to this liquid coolant passage 42 embodiment. In those embodiments wherein the electric motor 20 is liquid cooled, the electric motor 20 may be in communication with a housing coolant system 44. The housing coolant system 44 may be configured to cycle coolant through the passages 42 to remove thermal energy from housing 28 that is transferred to the housing 28 from the stator 22. The housing coolant system 44 may include one or more of a pump, a heat exchanger, a reservoir, sensors, a fan, fluid flow control devices, and the like. In an aircraft application, the heat exchanger may be an air-fluid heat exchanger that accepts a flow of air that may be provided by a thermal engine of the aircraft or the flow of air may be a captured flow of ambient air. The present disclosure is not limited to any particular housing coolant system configuration.

As indicated above, all electric motors have performance limits. Electric motors are typically configured to have a nominal power rating (i.e., a mechanical power output that the motor can safely produce at a given speed and voltage) and a maximum available power rating. The nominal power rating may be only thirty to thirty-five percent (30-35%) of the maximum available power rating. The maximum available power of an electric motor typically lies somewhere in the middle of the operating speed range of the electric motor. The electric motor cannot be operated at or above the maximum available power rating for an extended period of time or the electric motor will be damaged due to overheating.

The present disclosure provides improved cooling within the stator 22 of an electric motor 20 and that improved cooling is understood to improve the ability of an electric motor 20 to operate under a nominal power rating and a maximum available power rating. In some instances, the present disclosure may permit an electric motor 20 to operate at a maximum available power rating for a longer duration than would be otherwise possible without incurring thermal damage.

Figure 3:
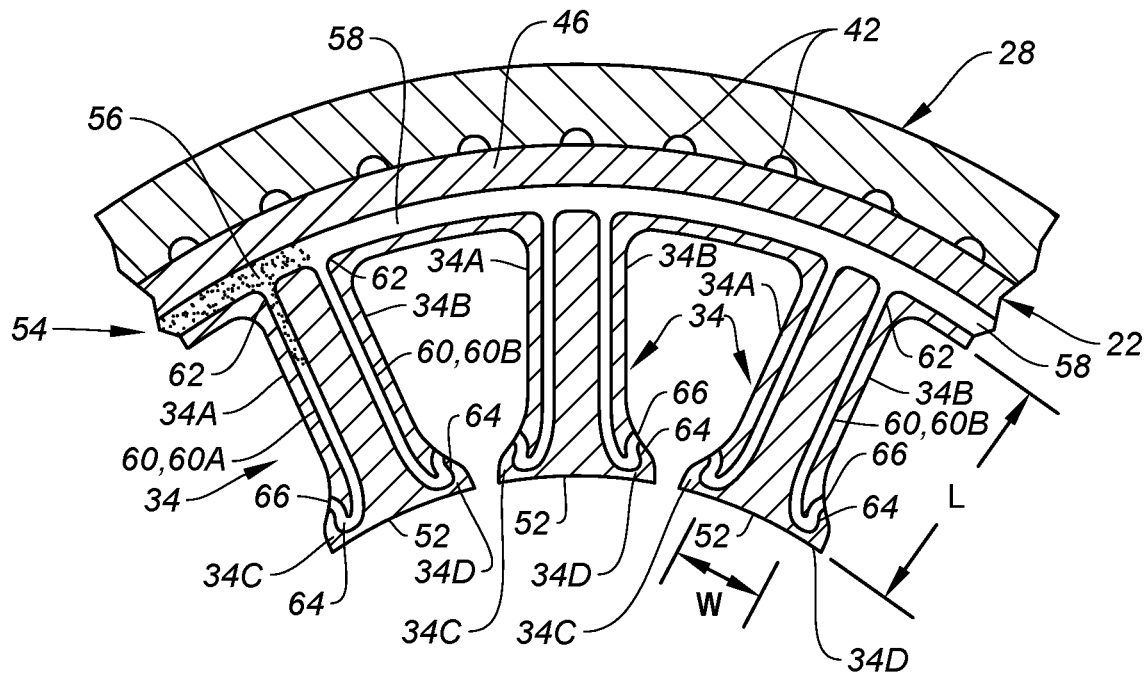
FIG. 3 is a diagrammatic partial view of a stator with a housing portion, partially illustrating a coolant circuit embodiment.

Referring to FIGS. 2 and 3, an electric motor stator 22 may an outer radial ring portion 46 and a plurality of stator poles 34 that extend radially inward from the ring portion 46, each stator pole 34 oriented toward a rotational axis 48 of the motor 20. The stator 22 may comprise a plurality of lamination layers 50, each having a thickness, that are assembled to collectively define the stator 22. The present disclosure is not limited to any particular stator lamination layer 50 configuration other than as is described hereinafter; e.g., for formation of coolant circuits.

Referring to FIG. 3, each stator pole 34 may be described as having a stem 35 portion that extends from the ring portion 46 to a distal end 52. A stator pole 34 may be described as having a stem width "W" that extends from a first lateral side 34A to a second lateral side 34B opposite the first lateral side 34A. A stator pole 34 may also be described as having a length "L" that extends from the ring portion 46 to the distal end 52. In some embodiments, stator poles 34 may be configured to have a "T" like configuration, wherein adjacent to the distal end 52 the stator pole 34 includes a first lateral extension 34C on the first lateral side 34A and a second lateral extension 34D on the second lateral side 34B, opposite the first lateral extension 34C, thereby creating the "T" like configuration. The first and second lateral extensions 34C, 34D of a stator pole 34 may be referred to as the "horns 34C, 34D" of the stator pole 34. As will be detailed herein, the present disclosure provides considerable utility when used with stator poles 34 having horns 34C, 34D, but the present disclosure is not limited to use with stator poles 34 having horns 34C, 34D. The distal end 52 of each stator pole 34 may be configured with a radiused configuration. Collectively, the stator pole 34 distal ends 52 define one side of the air gap 38 (see FIG. 2) between the stator poles 34 and the rotor poles 36. The present disclosure is not limited to any particular stator pole 34 geometric configuration; e.g., the stator poles 34 may or may not include horns 34C, 34D.

Figure 4:
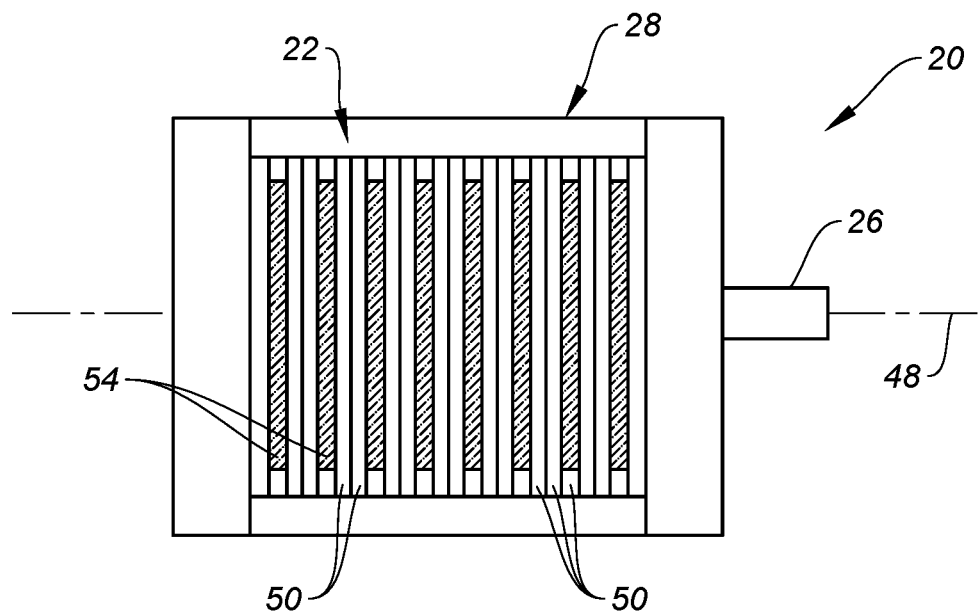
FIG. 4 is a diagrammatic representation of a present disclosure embodiment having a plurality of stator cooling circuits.

According to the embodiments of the present disclosure, the stator 22 includes a plurality of stator cooling circuits 54 configured to contain a coolant (e.g., a "ferro-coolant 56") as described herein. The plurality of cooling circuits 54 are disposed in the body of the stator 22 spaced apart from one another. For example, the cooling circuits 54 may be spaced apart from and parallel one another at positions along the rotational axis 48 of the motor. In some embodiments, a cooling circuit 54 may extend around the entire circumference of the stator 22. The cooling circuits 54 may be formed in various ways. In a first example, a cooling circuit 54 may be formed by etching (or otherwise removing material) from particular lamination layer 50. As another example, a lamination layer 50 may have a cooling circuit 54 formed as a void in that particular lamination layer 50; e.g., a void extending through a thickness of the lamination layer 50 between a first side surface of the lamination layer 50 and an opposite second side surface of the lamination layer 50. In this example, adjacent lamination layers 50 may be formed without the aforesaid voids. When the lamination layers 50 are collectively combined, the cooling circuit 54 may be formed by the lamination layer 50 with cooling circuit voids (i.e., the "channel void layer") being disposed between two contiguous lamination layers 50 without cooling circuit voids (i.e., the "no channel void layers"). In other words, the "channel void layer" and the two "no channel void layers" combine to form the cooling circuit 54. In alternative embodiments, a cooling channel may be formed by more than one the "channel void layer" being disposed between "no channel void layers". FIG. 4 diagrammatically illustrates a stator 22 with a plurality of lamination layers 50 with a plurality of cooling circuits 54 spaced apart from one another along the rotational axis 48 of the motor 20.

As shown in FIG. 3, a stator cooling circuit 54 may include an outer radial channel 58 and one or more stator pole cooling channels 60. The cooling circuit 54 may extend continuously around the entire circumference of the stator 22 (e.g., the outer radial channel 58 may extend around the entire circumference of the stator 22) and each stator pole channel 60 is in fluid communication with the outer radial channel 58. Each stator pole channel 60 extends from a first end 62 at the outer radial channel 58 to a distal end 64; e.g., extending lengthwise through the stem 35 portion of the stator pole 34. The first end 62 of each stator pole channel 60 is in fluid communication with the outer radial channel 58. An air vent 66 is disposed at each distal end 64. In the cooling circuit 54 embodiment shown in FIG. 3, a cooling circuit 54 includes a first stator pole channel 60A and a second stator pole channel 60B disposed within each stator pole 34. The first stator pole channel 60A extends lengthwise within the stator pole stem 35 adjacent the first lateral side 34A of the stator pole 34, and the second stator pole channel 60B extends lengthwise within the stator stem 35 adjacent the second lateral side 34B of the stator pole 34. The first stator pole channel 60A extends laterally into the horn 34C disposed on the first lateral side 34A and the respective air vent 66 extends radially outward; e.g., engaged with a radially outer portion of the horn 34C. The first stator pole channel 60A example shown in FIG. 3 has a "J" like shape with the air vent 66 extending away radially outward from the first stator pole channel 34A, away from the distal end 52 of the stator pole 34. The air vent 66 is in fluid communication with an exterior of the stator pole 34. In similar fashion, the second stator pole channel 60B extends laterally into the horn 34D disposed on the second lateral side 34B and the respective air vent 66 extends radially outward; e.g., in a manner like that described above with respect to the first stator pole channel 34A. Although each stator pole channel 60A, 60B is in fluid communication with a respective air vent 66, each cooling circuit 54 may be considered to be a closed circuit as will be detailed herein. As indicated above, the present disclosure is not limited to use with stator poles having horns. In the absence of horns, a stator pole channel 60 may have a "J" like (or other) shape with an air vent 66 extending away radially outward from the distal end distal end 52 of the stator pole 34, or similar configuration.

A coolant 56 that has magnetic properties is disposed within each coolant channel. The coolant 56 is referred to hereinafter as a "ferro-coolant 56" to facilitate the description herein. The term "magnetic properties" is used herein to describe that the ferro-coolant 56 includes particles that, when subjected to magnetic field gradients, produce motive forces acting on the ferro-coolant as will be detailed herein. A non-limited example of a ferro-coolant 56 having magnetic properties is a fluid configured to accept thermal energy and to release thermal energy that includes ferromagnetic or ferrimagnetic particles.

Figure 5:
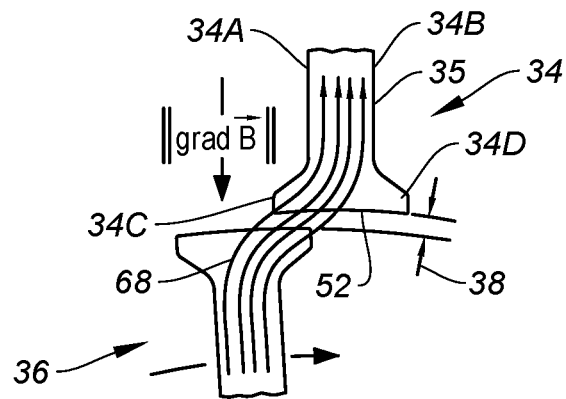
FIGS. 5-5B diagrammatically illustrate a stator pole relative to a rotor pole in three different rotational positions, illustrating magnetic flux extending therebetween.
Figure 5A:
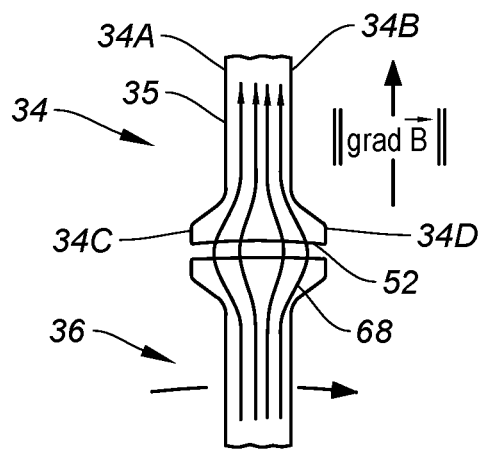
Figure 5B:
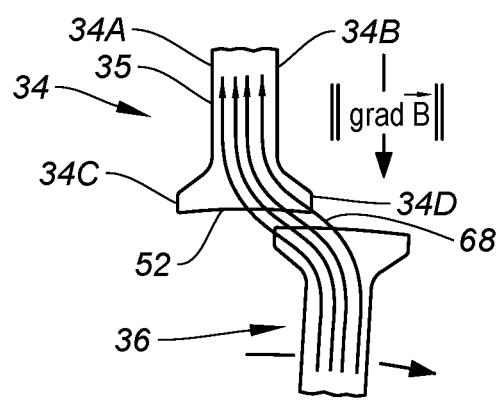

During operation of the electric motor 20, AC current fed into the stator 22 (e.g., into conductive windings (not shown) disposed around the stator poles 34) creates a rotating magnetic field and that rotating magnetic field in turn causes the rotor 24 to rotate relative to the stator 22. The rotating magnetic field includes a magnetic flux traveling between the rotor poles 36 and the stator poles 34; magnetic flux diagrammatically illustrated by lines 68 in FIGS. 5-5B. That magnetic flux can generate thermal energy within the stator poles 34. For a given set of motor operating conditions, the amount of magnetic flux that travels between a rotor pole 36 and a stator pole 34 remains constant. The area of the respective poles 34, 36 through which the magnetic flux passes varies as a rotor pole 36 rotationally passes by a stator pole 34. FIGS. 5-5B diagrammatically illustrates a rotor pole 36 rotating relative to a stator pole 34 in a clockwise direction. FIG. 5 illustrates a limited portion of the two poles 34, 36 (e.g., a horn 35C of the stator pole 34 and a horn of the rotor pole 36) aligned with one another. FIG. 5A illustrates the rotor pole 36 and the stator pole 34 aligned with one another. FIG. 5B illustrates a limited portion of the two poles 34, 36 (i.e., the opposite side horns of the stator pole 34 and the rotor pole 36) aligned with one another.

The magnetic flux passing between the rotor pole 36 and the stator pole 34 is constant in the three relative pole positions shown in FIGS. 5-5B. The magnetic flux passing through the limited aligned pole portions shown in FIGS. 5 and 5B produces a magnetic field saturation in those limited pole portions that is greater than the magnetic field saturation in the stems 35 of the poles. To facilitate the description, the magnetic field/flux will be described specifically with respect to the stator pole 34. In FIG. 5, the difference in magnetic field saturation between the portion of the distal end of the stator pole 34 (i.e., the horn 34C) and the stem 35 of the stator pole 34 produces a magnetic field gradient (symbolized as $$\left\| grad \underset{B}{\rightarrow} \right\|$$

between the stem 35 and the horn 34C, with the direction of the gradient (from low to high) directed towards the horn 34C. When the rotor and stator poles 36, 34 are aligned (as shown in FIG. 5A), the magnetic flux passing through the entire aligned portion of the stator pole distal end 52 produces a magnetic field saturation at the stator pole distal end 52 that is less than the magnetic field saturation in the stem 52 of the stator pole 34. The difference in magnetic field saturation between the distal end 52 of the stator pole 34 and the stem 35 of the stator pole 34 produces a magnetic field gradient between the distal end 52 and the stem 35, with the direction of the gradient (from low to high) directed away from the distal end 52. In FIG. 5B, the difference in magnetic field saturation between the portion of the distal end 52 of the stator pole 34 (i.e., the opposite horn 34D) and the stem 35 of the stator pole 34 produces a magnetic field gradient between the stem 35 and the horn 34D, with the direction of the gradient (from low to high) directed towards the horn 34D; i.e., a magnetic field gradient like that shown in FIG. 5.

The present disclosure leverages the shifting magnetic field gradients to produce motive force within the ferro-coolant 56 (see FIG. 3) that urges the ferro-coolant 56 into and out of stator pole channels 60; e.g., the magnetic field gradients may be described as "pumping" the ferro-coolant 56 into and out of the stator pole channels 60 (see FIG. 3). In the rotational pole positions shown in FIGS. 5 and 5B, the magnetic field gradients provide motive force that urges the ferro-coolant 56 into a respective stator pole channel 60A, and in the rotational pole position shown in FIG. 5A, the magnetic field gradient provides motive force that urges the ferro-coolant 56 out of the stator pole channel 60A. At the same time, the circumferentially traveling magnetic fields that cause the rotor 24 to rotate relative to the stator 22 also produce magnetic field gradients that provide motive force that urges the ferro-coolant 56 within the outer radial channel 58 (see FIG. 3) to travel circumferentially. Hence, under aspects of the present disclosure the ferro-coolant 56 travels both into and out of the respective stator poles 34 (transferring thermal energy from the distal ends-including the horns when present—to the radially outer portions of the stator 34 via the outer radial channel 58) and circumferentially within the outer radial channel 58 as well.

The air vent 66 (See FIG. 3) in fluid communication the distal end 64 of each stator pole channel 60 allows egress of any air that may be disposed within the respective stator pole channel 60 via the air vent 66 as ferro-coolant 56 is urged into the respective stator pole channel 60. The air vent 66 in fluid communication the distal end 64 of each stator pole channel 60 also allows ingress of air into a respective stator pole channel 60 via the air vent 66 as ferro-coolant 56 is urged out of the respective stator pole channel 60. In some embodiments, the air vents 66 may be configured such that the applicable magnetic gradients will not urge ferro-coolant 56 into (and out of) the air vents 66.

The above-description of magnetic field gradients and ferro-coolant flow is provided to give an example of ferro-coolant 56 flow within the cooling circuit 54. The specific ferro-coolant 56 flow pattern relative to a stator pole channel(s) 60 may vary depending on the configuration of the electric motor 20 components; e.g., the configuration of the stator poles 34, the rotor poles 36, the stator pole channels 60A, 60B, and the like. The present disclosure is not limited to the flow pattern described above; i.e., other circumferential ferro-coolant 56 flow patterns may be utilized within the scope of the present disclosure. As indicated above, each cooling circuit 54, although having air vents 66, may be considered to be closed circuit because the air vents 66 are disposed to accommodate the egress and ingress of air from stator pole channels 60A, 60B without ferro-coolant 56 leakage.

As indicated above, thermal energy is generated within the stator 22 and it is understood that the greatest amount of thermal energy is generated adjacent the distal ends 52 of the stator poles 34; e.g., in the horns 34C, 34D. The "pumping" of the ferro-coolant 56 into and out of a stator poles 34 via magnetic gradients enables the ferro-coolant 56 to remove thermal energy from key regions of a stator pole 34; e.g., the distal end 52 region of the stator pole 34, and more particularly the stator pole horns 34C, 34D when present. The outer radial channel 58 is disposed to transfer thermal energy into the electric motor housing 28. As stated above, the housing 28 may be configured to dissipate thermal energy. In some embodiments, the housing 28 may be air-cooled; e.g., having fins and/or other heat transfer structures (not shown) extending radially outward, or the like. The configuration of the outer radial channel 58 within the cooling circuits 54 in proximity to the housing 28 provides a heat transfer path to transfer thermal energy from the stator 22 (and in particular the stator poles 34) to the housing 28.

In those electric motor 20 embodiments having a housing 28 with liquid cooling, the heat transfer from the stator 22 (via the cooling circuit outer radial channels 58 in proximity to the housing 28—see FIG. 2) may be improved by the housing coolant system 44 transferring the thermal energy to the housing coolant and dissipating it, for example, by cycling it through a heat exchanger. Using the electric motor 20 example diagrammatically shown in FIG. 2, thermal energy generated within the stator poles 34 may be transferred to the ferro-coolant 56 within the stator cooling circuits 54, and that thermal energy may be then transferred to the outer radial ring portion 46 of the stator 22, and then to the housing coolant system 44 via the coolant passages 42 disposed in the housing 28, and finally dissipated within the housing coolant system 44.

Stator 22 temperature is a factor in determining the amount of time that an electric motor 20 can operate at a maximum available power setting. A conventional electric motor (without the present disclosure stator cooling) may be able to transfer thermal energy away from a conventional stator rapidly enough to keep critical portions of the stator (i.e., the stator poles 34, and the stator pole horns 34C, 34D in particular) at or below an acceptable maximum temperature (e.g., below a Curie temperature for the material) for a very limited period of time. The present disclosure, in contrast, is understood to provide a unique and significant solution to stator thermal generation that can significantly increase the amount of time that an electric motor 20 can operate at a maximum available power setting. An electric motor 20 configured according to the present disclosure may, therefore, be able to operate at a maximum available power setting longer than a similarly sized conventional electric motor. Alternatively, it may be possible to configure a present disclosure electric motor 20 in a size that is smaller (e.g., less weight, and the like) than a conventional electric motor and yet be configured to operate at a maximum available power setting for the same amount of time as a larger sized conventional electric motor.

Figure 6:
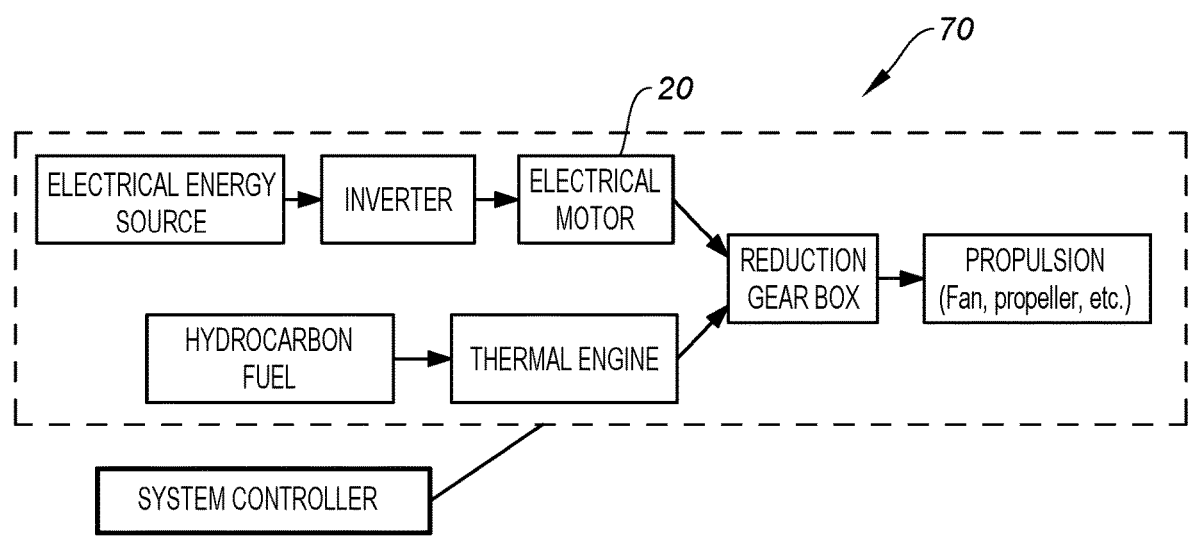
FIG. 6 diagrammatically illustrates an example of a hybrid electric system that may utilize a present disclosure electric motor.

Hybrid-electric propulsion (HEP) systems are an example of an aircraft application that utilizes an electric motor 20. In a HEP system, the electric motor 20 may be used for propulsion power. Electric motors may also be used in non-propulsion applications within a HEP system or within a conventionally powered aircraft propulsion system. FIG. 6 diagrammatically illustrates an example of a HEP system 70 that includes an electric energy storage device (e.g., a battery), an inverter, an electric motor 20, a reduction gear box, a thermal engine (e.g., a gas turbine engine, or a fuel compression engine, or the like), and a fuel source for the thermal engine. The HEP system 70 shown in FIG. 6 is an example of a HEP system and is not intended to be limiting. In this example HEP system 70, the electric motor 20 is an AC motor configured to provide propulsion power to a gearbox and the gearbox, in turn, drives a propulsion element; e.g., a fan, a propeller, or the like.

A present disclosure electric motor 20 with stator 22 cooling may be used in such a HEP system 70. The present disclosure cooled stator 22 is understood to significantly improve the cooling of the stator 22, and in particular the cooling of the stator poles 34 and stator pole horns 34C, 34D if present. The present disclosure stator 22 cooling is understood to permit the electric motor 20 to operate under a maximum available power setting for a longer period of time than would be possible with an electric motor having conventional stator 22 cooling. Alternatively, the HEP system may be configured to use a present disclosure electric motor 20 that is sized smaller (e.g., less weight, and the like) than a conventional electric motor and yet be configured to provide the same maximum available power requirements. A person skilled in the art will recognize that weight savings in an aircraft application are highly desirable.

The maximum available power provided by an electric motor may also advantageously impact the sizing of a thermal engine within a HEP system 70. In an aircraft application, several different flight operational scenarios (e.g., takeoff, one engine inactive-"OEI", and the like) typically dictate propulsion system requirements. For example, the propulsion requirements of a thermal engine in an aircraft during maximum speed cruise are typically a modest fraction (e.g., ~30-35%) of the propulsion requirements of the thermal engine in an aircraft during takeoff or OEI. A present disclosure electric motor 20 may enable the electric motor 20 in a HEP system 70 to shoulder a greater percentage of the peak demand operational scenarios (e.g., takeoff, OEI, and the like) and thereby reduce the propulsion requirements of the thermal engine. In this manner, the same size or a smaller thermal engine may be used in a HEP system 70. If the HEP system utilizes a present disclosure electric motor 20 and a conventionally sized thermal engine, the peak demands on the thermal engine may be reduced, which in turn may favorably increase the useful life of thermal engine components, maintenance requirements, and the like.

The terms "substantially", "generally" and/or "about" as contemplated herein are used to refer to a degree of deviation for the particular property identified. The latitude provided the terms "substantially", "generally" and/or "about" will depend on the specific context and particular property and can be readily discerned by those skilled in the art. The terms "substantially", "generally" and/or "about" are not intended to either expand or limit the degree of equivalents which may otherwise be afforded a particular value.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises"

means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An electric motor, comprising:
    a housing;
    a stator disposed in the housing in a positionally fixed manner; and
    a rotor having an output shaft, wherein the rotor is disposed radially inside of the stator and is configured for rotation relative to the stator about a rotational axis, and the rotor includes a plurality of rotor poles;
    wherein the stator includes an outer radial ring portion and a plurality of stator poles, wherein each stator poles extends radially inward from the outer radial ring portion to a stator pole distal end, and wherein the stator pole distal end of each of the plurality of stator poles are separated from the rotor poles by an annular air gap; and
    wherein the stator includes a plurality of stator cooling circuits, each stator cooling circuit including a circumferentially extending outer radial channel located in the outer radial ring portion of the stator and a stator pole channel disposed in each said stator pole, the stator pole channel in fluid communication with the outer radial channel, and the stator pole channel extending radially within the respective stator pole; and
    a coolant having magnetic properties disposed in the stator cooling circuits.

2. The electric motor of claim 1, wherein the outer radial channel of each stator cooling circuit extends around an entirety of a circumference of the stator.

3. The electric motor of claim 1, wherein each respective said stator pole channel within a respective cooling circuit extends from a first end at the outer radial channel to a stator pole channel distal end proximate the stator pole distal end, and an air vent is in fluid communication with the stator pole channel adjacent the stator pole channel distal end.

4. The electric motor of claim 1, wherein each respective stator pole has a width that extends between a first lateral side and a second lateral side, the second lateral side opposite the first lateral side and a radial length that extends from the outer radial ring portion to a distal end.

5. The electric motor of claim 4, wherein each respective cooling circuit includes a first stator pole channel disposed in each said stator pole and a second stator pole channel disposed in each said stator pole.

6. The electric motor of claim 5, wherein the first stator pole channel extends from a first stator pole channel first end at the outer radial channel to a first stator pole channel distal end proximate the stator pole distal end, and a first air vent is in fluid communication with the first stator pole channel adjacent the first stator pole channel distal end; and
    wherein the second stator pole channel extends from a second stator pole channel first end at the outer radial channel to a second stator pole channel distal end proximate the stator pole distal end, and a second air vent is in fluid communication with the second stator pole channel adjacent the second stator pole channel distal end.

7. The electric motor of claim 6, wherein each stator pole has a first lateral extension extending laterally out from the first lateral side adjacent the stator pole distal end, and a second lateral extension extending laterally out from the second lateral side adjacent the stator pole distal end.

8. The electric motor of claim 7, wherein the first stator pole channel extends into the first lateral extension, and the second stator pole channel extends into the second lateral extension.

9. The electric motor of claim 8, wherein the first air vent is in fluid communication with an exterior of the stator pole at a first point radially outward of the stator pole distal end, and the second air vent is in fluid communication with the exterior of the stator pole at a second point radially outward of the stator pole distal end.

10. The electric motor of claim 1, wherein the housing includes at least one liquid coolant passage.

11. The electric motor of claim 1, wherein the housing includes a plurality of liquid coolant passages disposed to receive thermal energy from the stator.

12. The electric motor of claim 1, wherein the stator comprises a plurality of lamination layers that collectively form the stator; and
wherein each respective cooling circuit of the plurality of cooling circuits is formed within a respective said lamination layer, and the plurality of cooling circuits are spaced apart from one another along the rotational axis.

13. The electric motor of claim 1, wherein the stator comprises a plurality of lamination layers that collectively form the stator; and
wherein each respective cooling circuit is formed by a first lamination layer having a channel void that extends through the first lamination layer between a first side surface of the first lamination layer and a second side surface of the lamination layer, a first adjacent lamination layer disposed contiguous with the first side surface of the first lamination layer and a second adjacent lamination layer disposed contiguous with the second side surface of the first lamination layer.

14. The electric motor of claim 1, wherein the stator is configured such that subjecting the stator to rotating magnetic fields causes the coolant to travel circumferentially within the outer radial channel.

15. The electric motor of claim 14, wherein the stator is configured such that subjecting the stator to the rotating magnetic fields produces magnetic field gradients that urge the coolant into the stator pole channel disposed in each said stator pole and subsequently urges the coolant from the stator pole channel disposed in each said stator pole.

16. The electric motor of claim 15, wherein the stator pole channel includes a stator pole channel distal end and an air vent in fluid communication with the stator pole channel adjacent the stator pole channel distal end, and wherein coolant urged into the stator pole channel causes air within the stator pole channel to egress from the stator pole channel through the air vent, and wherein coolant urged from the stator pole channel causes air to ingress into the stator pole channel to egress through the air vent.

17. A hybrid electric propulsion (HEP) system for an aircraft, comprising:
a thermal engine;
an electric motor;
a gearbox in communication with the thermal engine and the electric motor; and
an electric power storage unit configured to provide electrical power to the electric motor;
wherein the electric motor includes a housing, a stator disposed in the housing in a positionally fixed manner, and a rotor having an output shaft;
wherein the rotor is disposed radially inside of the stator and is configured for rotation relative to the stator about a rotational axis, and the rotor includes a plurality of rotor poles;
wherein the stator includes an outer radial ring portion and a plurality of stator poles, wherein each stator pole extends radially inward from the outer radial ring portion to a stator pole distal end, and wherein the stator pole distal end of each of the plurality of stator poles are separated from the rotor poles by an annular air gap; and
wherein the stator includes a plurality of stator cooling circuits, each stator cooling circuit including a circumferentially extending outer radial channel located in the outer radial ring portion of the stator and a stator pole channel disposed in each said stator pole, the stator pole channel in fluid communication with the outer radial channel, and the stator pole channel extending radially within the respective stator pole; and
a coolant having magnetic properties disposed in the stator cooling circuits.

18. The HEP system of claim 17, wherein the stator is configured such that subjecting the stator to rotating magnetic fields causes the coolant to travel circumferentially within the outer radial channel.

19. The HEP system of claim 18, wherein the stator is configured such that subjecting the stator to the rotating magnetic fields produces magnetic field gradients that urge the coolant into the stator pole channel disposed in each said stator pole and subsequently urges the coolant from the stator pole channel disposed in each said stator pole.

20. The HEP system of claim 17, wherein the housing includes at least one liquid coolant passage, and the at least one liquid coolant passage is in fluid communication with a housing coolant system configured to cycle a liquid coolant through the at least one coolant passage.

\* \* \* \* \*